(12) United States Patent
Figiel et al.

(10) Patent No.: US 6,387,475 B1
(45) Date of Patent: May 14, 2002

(54) WATER BASED ADHESIVE COMPOSITION WITH RELEASE PROPERTIES

(75) Inventors: Edmund W. Figiel, Ringoes; Robert L. Billmers, Stockton, both of NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/543,692

(22) Filed: Apr. 5, 2000

(51) Int. Cl.$^7$ ............................... B32B 7/12; C08L 3/04
(52) U.S. Cl. ............ 428/211; 428/355 R; 428/355 CP; 428/906; 524/1; 524/27; 524/47; 524/48; 524/80; 106/285
(58) Field of Search ............................... 428/211, 292.7, 428/355 R, 355 CP, 906; 524/1, 27, 47, 48, 80; 106/285

(56) References Cited

U.S. PATENT DOCUMENTS

| | | | |
|---|---|---|---|
| 2,661,349 A | 12/1953 | Caldwell et al. ............ 260/224 |
| 5,672,699 A | 9/1997 | Billmers et al. ............ 536/102 |
| 5,756,646 A | * 5/1998 | Nasu et al. ............... 525/329.4 |
| 5,797,984 A | * 8/1998 | Billmers et al. ......... 106/207.1 |

OTHER PUBLICATIONS

"Modified Starches: Properties and Uses", edited by O. Wurzburg, Chapter 9, 1986, pp. 131–147.
M.W. Rutenberg, "Starch and Its Modification", in "Handbook of Water Soluble Gums and Resins", edited by R.L. Davidson, Chapter 22, 1980, pp. 22–68 to 22–70.
"Starch Chemistry and Technology" Second Edition, edited by R.L. Whistler et al., 1984, pp. 341–343.
"Starch Chemistry and Technology", Second Edition, edited by R.L. Whistler et al., Chapter XX, 1984, pp. 593–610.

* cited by examiner

Primary Examiner—James J. Seidleck
Assistant Examiner—Travis B Ribar
(74) Attorney, Agent, or Firm—Cynthia L. Foulke

(57) ABSTRACT

An aqueous adhesive composition with good release properties comprising a water based adhesive and a metal activated dicarboxylic acid anhydride starch derivative as release agent. This adhesive composition is useful in forming coreless paper rolls.

20 Claims, No Drawings

WATER BASED ADHESIVE COMPOSITION WITH RELEASE PROPERTIES

BACKGROUND OF THE INVENTION

This invention relates to water based adhesive compositions having good release properties as well as adhesion, stiffness and strength properties making it useful in paper applications such as tissue and towels requiring release properties and coreless paper rolls. More particularly, this invention involves an aqueous adhesive composition comprising a water based adhesive and a substituted dicarboxylic acid anhydride starch derivative as a release agent.

Starches and dextrins have long been used as adhesive materials in various applications such as the fabrication of corrugated boards, paper bags, paper boxes, laminated paperboard, spiral-wound tubes, gummed labels, gummed tapes and other gumming applications. Disclosure of these and other applications may be found in "Starch Chemistry and Technology", Second Edition, edited by R. Whistler et al., 1984, pp. 593–610 and "Starch and its Modifications", Chapter 22, by M. W. Rutenberg, pp. 22–68 to 22–70 in "Handbook of Water-Soluble Gums and Resins", edited by Robert L. Davidson, 1980.

Typical adhesives categories include liquid adhesives, pastes, cold water soluble adhesives and water resistant adhesives and provide properties such as tack, adhesives, solution viscosity and stability. While starch adhesives have been used in such applications, they generally do not provide release properties. Typically, separate release agents and coatings are used and they comprise materials such as silicones and waxes.

Now it has been found that a water based adhesive, such as starch adhesive composition in accordance with this invention, provides good release properties in addition to adhesion, stiffness and strength properties. This unusual combination of properties makes this composition particularly suitable in paper applications requiring release and strength properties such as needed in tissue and towel applications. Also this composition has been found suitable for use in coreless paper rolls where stiffness and strength as well as release properties are important characteristics. The nature of the adhesive as a starch material which is biodegradable and environmentally friendly also makes it attractive in paper applications where repulpability and recyclability are desired. Other possible applications for this adhesive-release composition include folding cartons, coupons or labels, envelopes and cigarette packaging.

SUMMARY OF THE INVENTION

Now it has been found that an adhesive composition with good release properties is provided by an aqueous composition comprising a water based adhesive and a substituted dicarboxylic acid anhydride starch derivative as a release agent.

More particularly, this invention is directed to an aqueous adhesive composition with good release properties comprising:

a) a water soluble polymer having a viscosity of less than about 25,000 cPs at a temperature of about 22° C. and a solids of 10% or more, and b) an effective amount of a release agent having the formula:

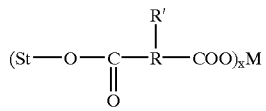

where St is starch, R is a dimethylene or trimethylene group, R' is a substituent hydrocarbon having 8 to 18 carbon atoms, M is a polyvalent metal and x is an integer equal to the valence of M.

This invention also involves an in-situ method of preparing the water based adhesive composition as described above wherein:

a) a water soluble polymer is dispered in water, b) a substituted dicarboxylic acid anhydride starch derivative having the following formula is added to the polymer solution,

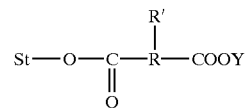

where St is the starch base material, R is a dimethylene or trimethylene group, R' is a substituent hydrocarbon group having 8 to 18 carbon atoms and Y is alkali metal or ammonium, and c) multivalent metal activator is added and dissolved in the solution.

DETAILED DESCRIPTION OF THE INVENTION

The adhesive-release composition of this invention comprises a water soluble polymer or polysaccharide adhesive in combination with a metal activated substituted dicarboxylic acid anhydride starch derivative as a release agent.

The water soluble polymer material useful as the adhesive component may be any polysaccharide including starch, dextrin, cellulose and gums, as well as polyvinyl alcohol and resins. Particularly useful are the starches and dextrins including any of the several starches, native, converted or derivatized, Such starches include those derived from any plant source including corn, potato, wheat, rice, sago, tapioca, waxy maize, sorghum and high amylose starch such as high amylose corn, i.e. starch having at least 45% amylose content by weight. Starch flours may also be used. Also included are the conversion products derived from any of the former bases, such as, for example, dextrins prepared by hydrolytic action of acid and/or heat; fluidity or thin boiling starches prepared by enzyme conversion or mild acid hydrolysis; oxidized starches prepared by treatment with oxidants such as sodium hypochlorite; and derivatized or modified starches such as cationic, anionic, amphoteric, non-ionic, crosslinked and hydroxypropyl starches. Other useful polysaccharides are cellulose materials such as carboxymethylcellulose, hydroxypropyl cellulose and hydroxypropyl methylcellulose, and gums such as guar, xanthan, pectin and carrageenan. Also useful polymers are polyvinyl alcohol, polyacrylic acid and protein materials such as animal glue as well as resins and resin emulsions such as polyvinyl acetate and ethylvinyl acetate.

The water soluble adhesive component will suitably have a viscosity of less than about 25,000 cPs at room temperature (about 22° C.) and a solids content of less than about 25,000 cPs at room temperature (about 22° C.) and a solids content of at least 10%, more particularly about 10 to 80%, and preferably a viscosity of from about 500 to 2,000 cPs and a solids of at least 30%, more particularly about 30 to 50%.

The release agent or fugitive adhesive additive as used in this invention is a material having the formula:

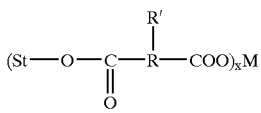

where St is starch, R is a dimethylene or trimethylene group, R' is a substituent hydrocarbon having 8 to 18 carbons, M is a polyvalent metal and x is an integer equal to the valence of M. More particularly, R is a dimethylene group and R' is a hydrocarbon group having 8 to 12 carbons. The hydrocarbon substituent group R' may be an alkyl, alkenyl, aryl, aralkyl, or aralkenyl group, preferably an alkyl or alkenyl and more preferably alkenyl. M is a polyvalent or multivalent metal with a valence of 2 or more, such as calcium, aluminum, magnesium, iron, zinc and antimony with calcium and aluminum being preferred. The amount of derivative group on or bound to the starch, i.e.

i.e. 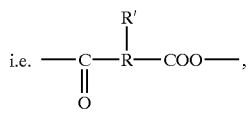

will be from about 0.5 to 25% and preferably from about 1 to 10% by weight based on the weight of dry starch. Any of the starches can be used in preparing the release agent as described above. This includes any of the native, converted, modified or derivatized starches. Such starches include those derived from any plant source including corn, potato, wheat, rice, sago, tapioca, waxy maize, sorghum and high amylose starch such as high amylose corn, i.e. starch having at least 45% amylose content by weight. Starch flours may also be used. Also included are the conversion products derived from any of the former bases, such as, for example, dextrins prepared by hydrolytic action of acid and/or heat; fluidity or thin boiling starches prepared by treatment with oxidants such as sodium hypochlorite; and derivatized or modified starches such as cationic, anionic, amphoteric, non-ionic, crosslinked and hydroxypropyl starches.

The preparation of hydrocarbon substituted starch derivatives is known and described in U.S. Pat. No. 2,661,349 issued Dec. 1, 1953 to C. Caldwell et al. and also in "Starch: Chemistry and Technology", Second Edition, edited by R. L. Whistler et al., 1984, pp. 341–343 and "Modified Starches: Properties and Uses", edited by O. Wurzburg, 1986, Chapter 9, pp. 131–147. An improved method for preparing the hydrocarbon or hydrophobic derivative is disclosed in U.S. Pat. 5,672,699 issued on Sep. 30, 1997 to R. Billmers et al. and is incorporated herein by reference. In the '699 patent, the starch and anhydride are predispersed or intimately contacted by mixing at low acidic pH before being brought to alkaline reaction conditions.

While the hydrocarbon substituted starch polyvalent derivative release agent as used in this invention may be prepared separately, as described above, and then added to the aqueous adhesive component, it does not readily disperse therein. Therefor, an in-situ method has been developed wherein:

a) a water soluble polymer is dispersed in water,
b) a soluble alkali metal or ammonium salt of the substituted dicarboxylic acid anhydride starch is added to the starch solution, and
c) a multivalent metal salt activator is added and dissolved in the solution.

If the starch being dispersed is a granular starch, it needs to be cooked by batch, steam injection, jet cooking or other chemical cooking operation and if the starch is cold water soluble it needs to be dispersed or stirred in warm water.

The polyvalent or multivalent salt activator that is used in preparing the release agent can be any water soluble polyvalent metal salt where the metal has a valence of 2 or more. More particularly, the metal is any polyvalent metal or polyvalent transition metal and is selected from groups 2 to 15 of the periodic table (revised IUPAC form in CRC Handbook of Chemistry and Physics, 76th Edition, 1995–1996) The salt activator or compound may be represented by the formula:

$$M_aX_b$$

where M is a polyvalent metal, X is a salt anion and a and b are integers of 1 to 6. Illustrative polyvalent or multivalent metals include calcium, aluminum, magnesium, iron, zinc and antimony with calcium and aluminum being preferred. X can be any salt anion such as chloride or halides, sulfate, nitrate, acetate and hydroxide. Sufficient quantity of the activator is provided to tie up or crosslink all or essentially all of the carboxylic acid groups on the substituted starch derivative.

The amount of release agent used in the aqueous adhesive composition of this invention will depend on the particular application and the desired release properties. The aqueous adhesive composition will suitably contain from about 5 to 70% of solids content by weight and preferably about 30 to 50%. More particularly, the adhesive composition will comprise from about 30 to 90%, preferably about 40 to 55% by weight of adhesive, about 10 to 70%, preferably about 40 to 55% by weight of release agent and from about 0 to 20%, preferably about 0 to 5% by weight of other additives and ingredients based on the total solids weight of the formulation.

As noted above, in addition to the main adhesive and release agent components, minor amounts of conventional additives and ingredients may optionally be added to the adhesive composition of this invention. Such additives and ingredients include colorants, preservatives, humectants, fillers, pigments, viscosity modifiers, flow modifiers, etc. Typically, these additives will comprise from about 0 to 20% and more particularly 0 to 5% by weight based on the total solids weight of the composition.

The adhesive composition of this invention has a unique combination of properties including adhesion, stiffness and strength in addition to release properties. These properties make the composition suitable for use in a variety of applications and especially paper applications where strength and release are important desired characteristics, for example in tissue and towels. Also, the adhesive is especially suitable for coreless paper rolls where its strength attributes allow for the elimination of the tubes that typically are used to hold and support the paper. Other possible applications for this adhesive include folding cartons, coupons or labels, envelopes and cigarette packaging. Additionally, since the composition mainly comprises starch, a biodegradable and environmentally friendly material, it is suitable in paper and other applications where repulpability and recyclability are desired.

The formation of coreless paper rolls or coreless tubes using the adhesive composition of this invention involves forming rolls of paper or tissue/towels without the use of a tube or foreign support to hold the main body of the rolled paper substrate. By applying an effective amount of the adhesive composition to provide sufficient stiffness, the rolled paper will maintain its shape and integrity. While the adhesive composition can be applied to the entire surface of the paper substrate, in order to be effective and also economically attractive less than about 10% of the beginning or first part of the substrate surface may be covered, i.e. from about 0.1 to 10% of the substrate surface. More particularly, less than about 5% of the substrate surface will be covered with adhesive composition. By the beginning or first part of the substrate is meant the end of the paper which will be initially wound and form the inner part of the coreless roll. The amount of adhesive composition that is applied to the paper substrate will also be an effective amount of up to about 10 g/m$^2$ of paper, more particularly from about 0.1 to 10 g/m$^2$ of paper, and preferably from about 0.1 to 1 g/m$^2$. The adhesive composition can be applied using any known methods for applying such materials including spraying, roll coating (film transfer), extrusion, etc.

The following examples will further illustrate the embodiments of this invention. In these examples, all parts are given by weight and all temperatures in degrees Celsius unless otherwise noted.

EXAMPLE I

A hydrocarbon substituted starch derivative was prepared by treating waxy starch with octylsuccinic anhydride (OSA) as follows. Five hundred (500) grams of waxy corn were slurried in 750 mL of water and the pH adjusted to 7.5 using 3% sodium hydroxide. Fifteen (15) grams of octenylsuccinic anhydride (OSA) were added in one-third increments every thirty minutes while maintaining the pH at 7.5 using 3% sodium hydroxide and constant agitation. The starch was filtered out and washed with 750 mL of water. The starch was then reslurried in 500 mL of water and the pH adjusted to 5.5 with 3:1 hydrochloric acid. The starch was then filtered, washed with 750 mL of water, and air dried.

EXAMPLE II

Another hydrocarbon substituted starch derivative, dodecenylsuccinic anhydride (DDSA) treated corn starch was prepared as follows. Five hundred (500) grams of corn starch was slurried in 750 mL of water and the pH adjusted to 2.5 with HCl. Fifteen (15) grams of dodecenylsuccinic anhydride (DDSA) were added with high shear mixing in a Waring blender. The pH was increased to 8.5 with 3% sodium hydroxide and maintained until stable (no change in pH over five minutes without addition of caustic). The slurry was neutralized to a pH of about 6 with HCl, then filtered and washed with 750 mL of water. The starch was reslurried in 500 mL of water and the pH adjusted to 5.5 with 3:1 hydrochloric acid. The starch was then filtered, washed with 750 mL of water and air dried.

EXAMPLE III

A starch adhesive-release composition was prepared using the hydrocarbon substituted starch derivative (OSA treated waxy corn) of Example 1 as follows. To a twenty liter tank equipped with an overhead mixer, 7.5 liters of water were added, Three (S) kg of Crystal Tex 627 (dextrin available from National Starch and Chemical Co., Bridgewater, N.J.) were added to the tank and mixed until dissolved. Two (2) kg of the OSA starch derivative from Example I were slurried into the formulation until uniform. The pH was recorded and 20 grams of alum (aluminum sulfate) activator was added and stirred until dissolved. The pH was again recorded and the formulation allowed to mix for an additional thirty minutes. The adhesive was cooled to ambient temperature and was then ready for use.

Another adhesive formulation was prepared in a similar manner using the DDSA hydrocarbon starch derivative from Example II and calcium chloride activator. Both adhesive formulations were used in the preparation and testing of tissue samples as shown in Examples IV and V.

EXAMPLE IV

Tissue samples using the adhesive formulations of Example III and variations thereof were prepared as follows. A single ply tissue (basis weight 9.3 lbs./3000 ft) measuring 11×30 cm. was weighed and recorded. A glass plate measuring 8×15 inches was used as a drawdown board. The adhesive composition from Example III (OSA treated waxy corn plus aluminum sulfate and dextrin) was applied to the glass plate with a six inch Bird applicator and provided a film thickness of 0.5 mil. A 1 inch diameter chrome polished pipe, 6 inches in length, was used as a support for the paper. The tissue was rolled onto the pipe keeping the edges in line. The tissue was applied to the adhesive by unfurling the roll using the pipe as a roller (one pass only with slight pressure). The sample tissue was rolled back onto the pipe keeping the edges in fine and lifting the tissue from the glass. The tissue sample was then placed in a drying oven at 120° F. for five minutes. The paper roll was slid away from the pipe and then weighed. Pick-up was then calculated by comparing to base weight as follows:

$$\text{Pick-up (\%)} = \frac{(\text{sample} + \text{adhesive weight}) - \text{initial weight}}{\text{initial weight}} \times 100$$

EXAMPLE V

The paper tube core prepared in Example IV was tested for stiffness (crush test) and release properties (fiber tear) as follows. The sample paper tube was tested for stiffness by placing a 25 g. weight onto the side of the tube and observing any collapse (crush test). Release properties were determined by suspending the chrome pipe by the ends and completely unwinding the paper core at moderate speed (about 2 seconds). The paper tissue was then examined for any fiber tear or high resistance to unwinding. The results for the noted sample plus other sample variations (all paper samples made as in Example IV and tested as described above) are shown in Table 1.

TABLE 1

| Adhesive Starch | Release Agent Release Starch | Activator | Crush Test | Release (% fiber tear) |
|---|---|---|---|---|
| Tapioca[1] | Tapioca OSA | None | Passed | Poor (45) |
| Tapioca[1] | Waxy OSA | Alum | Passed | Excellent (0) |
| Tapioca[1] | Waxy DDSA | Calcium Chloride | Passed | Excellent (0) |
| Tapioca[1] | Corn DDSA | Calcium Chloride | Passed | Excellent (0) |
| Corn[2] | Tapioca OSA | Alum | Passed | Good (10) |
| Corn[2] | Waxy DDSA | Calcium Chloride | Passed | Good (10) |
| Potato | Waxy DDSA | Calcium Chloride | Passed | Excellent (0) |

TABLE 1-continued

| Adhesive Starch | Release Agent | | Crush Test | Release (% fiber tear) |
| --- | --- | --- | --- | --- |
| | Release Starch | Activator | | |
| Tapioca[1] | Corn acetate[3] | N/A | Passed | Poor (40) |
| Tapioca[1] | None | Alum | Passed | Bad (95) |
| None | Waxy DDSA | Calcium Chloride | Failed | Excellent (0) |
| Corn[2] | None | Calcium Chloride | Passed | Bad (90) |

[1] = Crystal Tex ™ 627 dextrin available from National Starch and Chemical
[2] = Nadex ™ 320 dextrin available from National Starch and Chemical
[3] = National 78-0469 available from National Starch and Chemical This example demonstrates the function of each ingredient. The dextrin adhesive provides the stiffness (crush resistance), while the addition of the release agent (including activator) affords the non-fiber tearing release properties.

What is claimed is:

1. An aqueous adhesive composition with good release properties comprising:
   a) a water soluble polymer having a viscosity of less than about 25,000 cPs at a temperature of about 22° C. and a solids of 10% or more by weight, and
   b) an effective amount of a release agent having the formula:

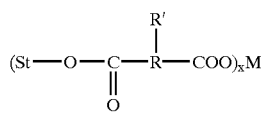

where St is starch, R is dimethylene or trimethylene, R' is a substituent hydrocarbon having 8 to 18 carbon atoms, M is a polyvalent metal and x is an integer equal to the valence of M.

2. The composition of claim 1 wherein the polymer is a polysaccharide.

3. The composition of claim 2 wherein the polysaccharide is starch or dextrin and R is dimethylene.

4. The composition of claim 3 wherein R' is an alkyl, alkenyl, aryl, aralkyl or aralkenyl group.

5. The composition of claim 4 wherein R' has 8 to 12 carbon atoms.

6. The composition of claim 5 wherein M is calcium or aluminum.

7. The composition of claim 1 wherein from about 30 to 90% by weight of the water soluble polymer and from about 10 to 70% by weight of the release agent, based on the total solids weight of the composition are used.

8. The composition of claim 7 wherein the polymer is a polysaccharide.

9. The composition of claim 8 wherein the polysaccharide is starch or dextrin, R is dimethylene and R' is an alkyl, alkenyl, aryl, aralkyl or aralkenyl group.

10. The composition of claim 9 wherein R' has 8 to 12 carbon atoms.

11. The composition of claim 10 wherein M is calcium or aluminum.

12. The composition of claim 10 wherein R' is an alkylene group.

13. A method for preparing an aqueous adhesive composition wherein:
   a) a water soluble polymer is dispersed in water,
   b) a substituted dicarboxylic acid anhydride starch derivative having the following formula is added to the starch solution:

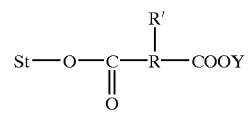

where St is the starch base material, R is a dimethylene or trimethylene group, R' is s substituent hydrocarbon group having 8 to 18 carbon atoms, and Y is alkali metal or ammonium, and
   c) a polyvalent metal salt activator is added and dissolved in the solution.

14. The method of claim 13 wherein the polyvalent metal is calcium, aluminum, magnesium, iron, zinc or antimony.

15. The method of claim 14 wherein R is dimethylene and R' is an alkyl, alkenyl, aryl, aralkyl or aralkenyl group having 8 to 12 carbon atoms.

16. The method of claim 15 wherein the polyvalent metal is calcium or aluminum.

17. The method of claim 16 wherein R' is an alkenyl group.

18. A coreless rolled paper product wherein an effective amount of the adhesive composition of claim 1 is applied to a first end portion of the paper and the paper is then wound beginning with the adhesive coated portion to form a self supporting roll.

19. The coreless paper product of claim 18 wherein the adhesive is applied to 0.1 to 10% of the surface of the paper substrate.

20. The coreless paper product of claim 17 wherein the water soluble polymer of the adhesive composition is starch or dextrin and in the release agent R is dimethylene, R' has 8 to 12 carbon atoms and M is calcium or aluminum.

* * * * *